United States Patent

[11] 3,557,895

| [72] | Inventor | Frank W. Thomas |
| | | 100 Dairy Road, Baltimore, Md. 21120 |
| [21] | Appl. No. | 793,682 |
| [22] | Filed | Jan. 24, 1969 |
| [45] | Patented | Jan. 26, 1971 |

[54] BATTERY SECURING MEANS
4 Claims, 7 Drawing Figs.

| [52] | U.S. Cl. | 180/68.5 |
| [51] | Int. Cl. | B60r 18/02 |
| [50] | Field of Search | 180/68.5 |

[56] References Cited
UNITED STATES PATENTS

| Re25,480 | 11/1963 | Merkle | 180/68.5 |
| 1,867,735 | 7/1932 | Dunzweiler | 180/68.5 |
| 2,514,056 | 7/1950 | Hatfield | 180/68.5 |
| 2,994,395 | 8/1961 | Hall | 180/68.5 |
| 3,125,177 | 3/1964 | Paller | 180/68.5 |

*Primary Examiner*—Benjamin Hersh
*Assistant Examiner*—Milton L. Smith
*Attorneys*—J. Wesley Everett and George L. Brehm

ABSTRACT: A securing means for batteries, particularly for use with motor vehicles, wherein is provided a support for receiving the base or bottom of the battery and a holddown arrangement in which there is provided battery-engaging members adapted to engage the opposite top edges of the battery having a plurality of horizontal openings therethrough and including at least one clamping element in the form of a long bolt having one end secured to the battery support, or to a portion of the vehicle adjacent the support, and the other end of the bolt being threaded to receive a nut wherein the bolt extends vertically to a point at least adjacent the upper surface of the battery and is connected with the battery-engaging members by means of a hooked clip adapted to engage any one of the horizontal openings in the battery-engaging member, said hook members having a vertical aperture therethrough to receive the threaded ends of the bolts whereby the battery-engaging members may be forced downwardly on the battery by the nut, and means for adopting at least one of the battery-engaging members to a modified form of holddown in the form of a bracket for securing the battery to the support.

PATENTED JAN 26 1971
3,557,895
SHEET 1 OF 3
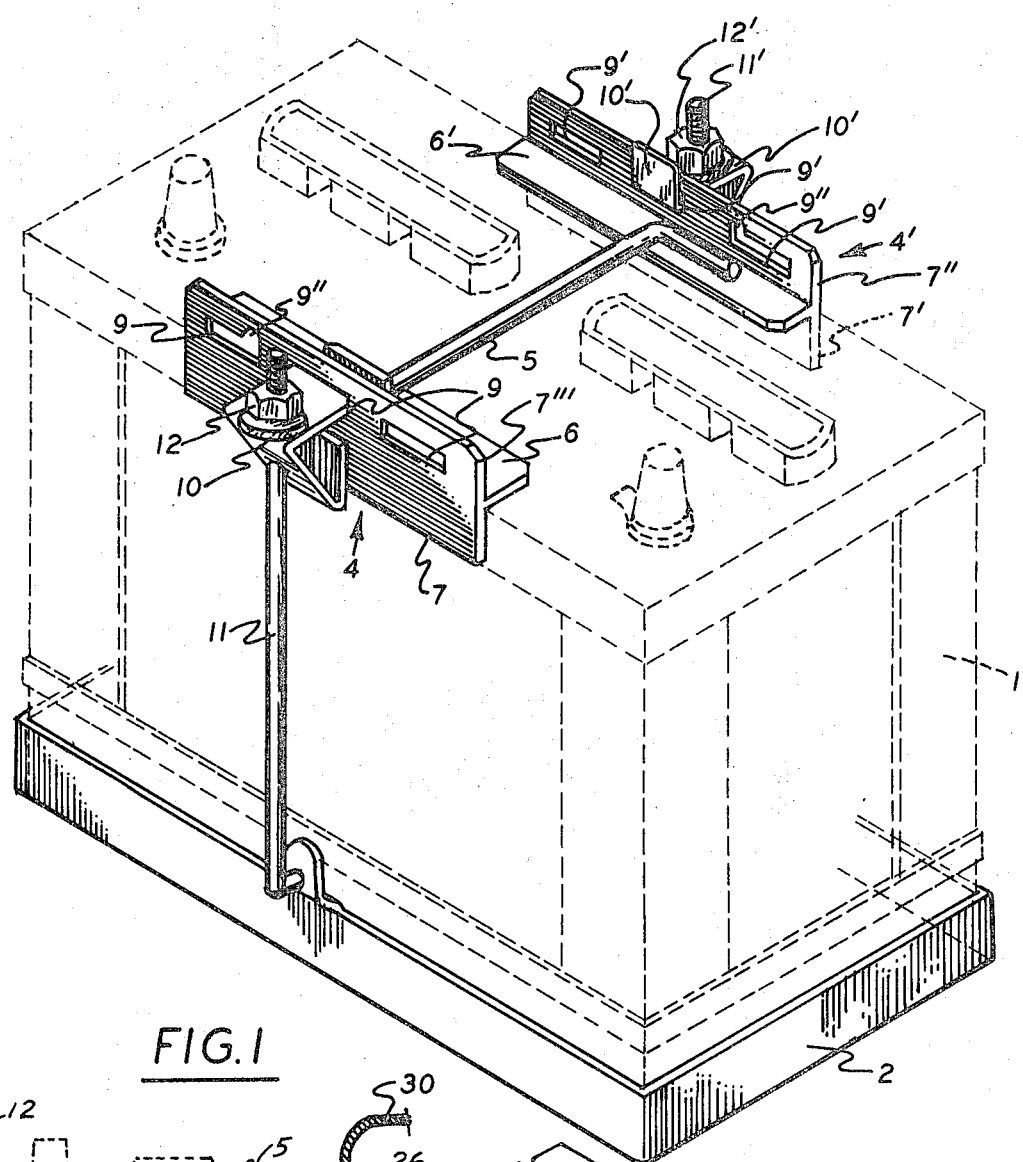
FIG.1
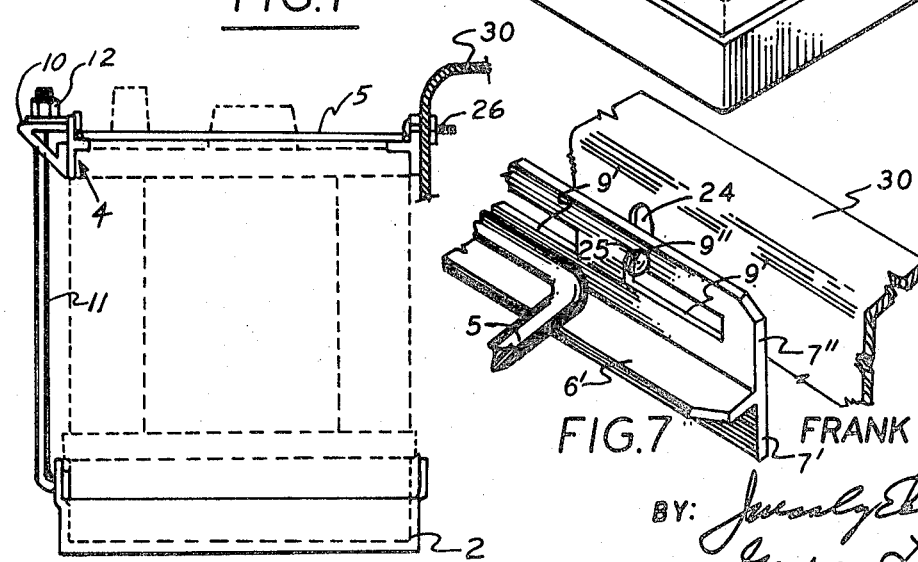
FIG.6
FIG.7
INVENTOR
FRANK W. THOMAS
BY:
ATTORNEY
AGENT

INVENTOR
FRANK W. THOMAS 3,557,895
SHEET 3 OF 3
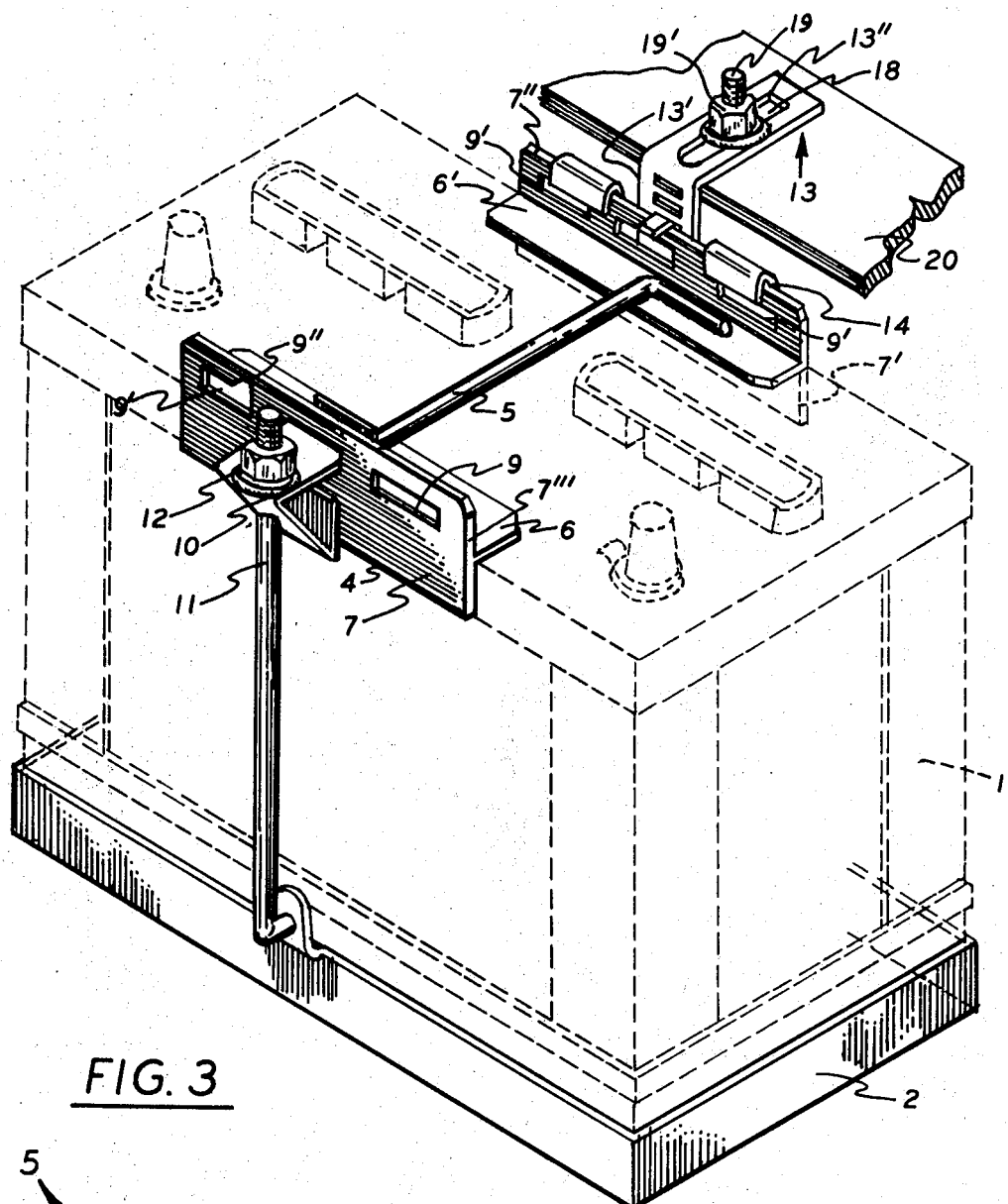
FIG. 3
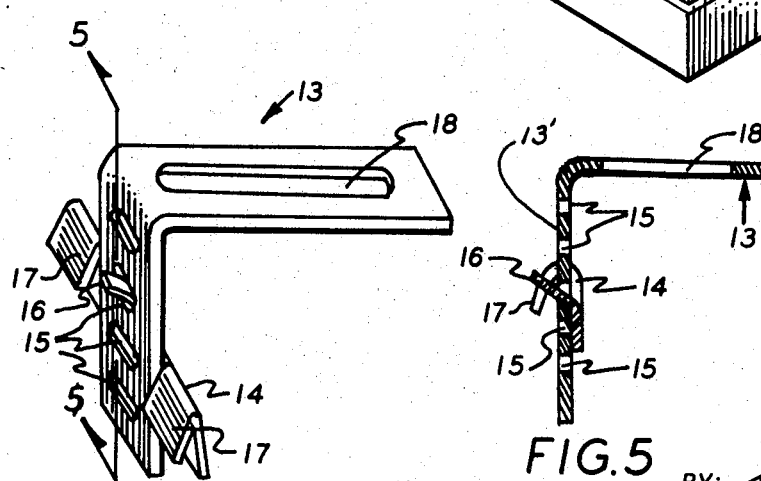
FIG. 4
FIG. 5
INVENTOR
FRANK W. THOMAS
BY:
ATTORNEY
AGENT

BATTERY SECURING MEANS

The present invention relates to a battery securing means of the type used to hold a vehicle battery in place.

There are many types of battery securing means, sometimes referred to as "battery hold-downs," on the market today, and many of the more popular types employ a rigid member which spans the top of the battery, having means at diametrical sides of the battery engaging the top edges thereof to receive long bolts extending upwardly from the base, or from a part of the vehicle on which the battery rests. The upper ends of the bolts are threaded and extend up through apertures in the rigid members whereby pressure may be applied by threaded nuts to the rigid members, which engage the top edge of the battery forcing the rigid members and battery downwardly to hold the same in a fixed position against the base, or other support. In some of the more recent types of vehicles, because of limited space, the long holddown bolt on at least one side of the battery is not always satisfactory as it has been found necessary at times to place one side of the battery close to a body part which interferes with the use of the usual long holddown bolts on that side of the battery, therefore, a different arrangement must be made to hold down at least the side of the battery positioned adjacent the close body part.

It is the primary object of this invention to provide a battery securing means for use in vehicles in which means are provided to adjust the position of the long holddown bolt relative to the battery and for holddown means for at least one side of the battery that may be substituted for the long holddown bolts when the battery cannot be always held down by two operatively arranged bolts, for the reason that the battery is placed close to the body or frame member of the vehicle.

It is another object of this invention to have battery hook clips horizontally adjustable along the battery engaging members wherein the location of the holddown bolt may be adjusted horizontally along each of the individual clip members.

A further object of the invention is to provide a holddown arrangement in which one element comprising a long holddown bolt having one end secured to the bottom of the battery support or to the vehicle frame and the other end of the bolt having a thread and nut fastened to the adjustable hook clip which operatively engages the upper edge portion of the battery engaging member to hold the battery securely in place.

The above and other objects and advantages will become more apparent as this description proceeds and reference is had to the accompanying drawings forming a part of this specification and in which:

FIG. 1 is a perspective view of a battery securing means according to one form of the invention;

FIG. 3 is a perspective view of the battery securing means in which one side of the battery is secured to a portion of the vehicle or to a part of the vehicle;

FIG. 4 is a perspective view of a modified form of adjustable bracket assembly element for engaging the hook clamp for use on, at least, one side of the battery in place of the long holddown bolt;

FIG. 5 is a section taken on line 5–5 of FIG. 4;

FIGS. 6 and 7 illustrate still another form of holddown arrangement for one side of the battery.

Figure 2:
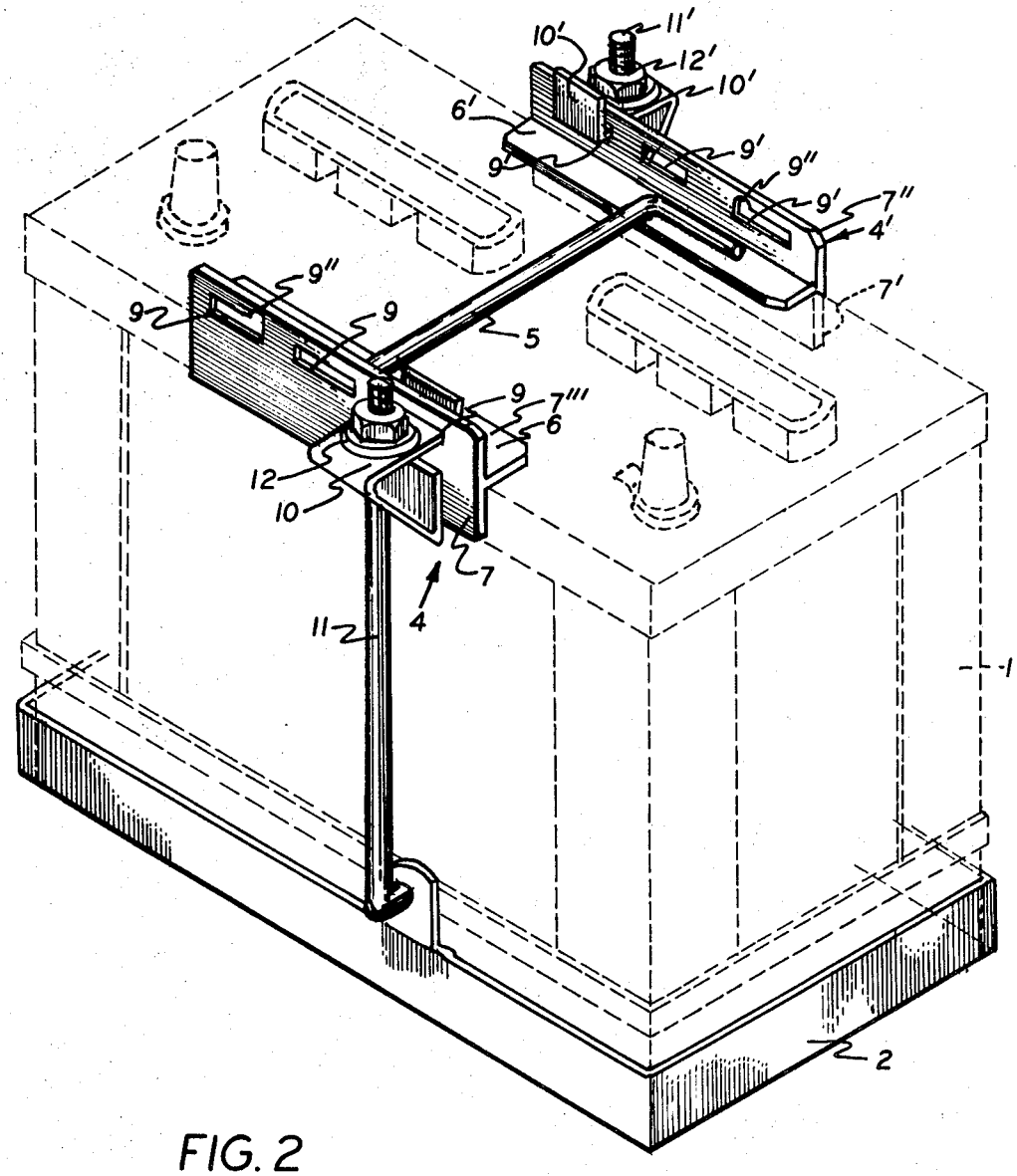
FIG. 2 is a perspective view similar to that shown in FIG. 1 showing the holddown bolts adjusted to different positions along the battery engaging members.

Referring now to the drawing in more detail, 1 represents a conventional automobile battery shown in phantom, as it forms no part of the invention herein. The battery is shown resting on a fixed support of the vehicle, which may be in the form of a shallow pan 2 fixedly secured to the vehicle.

To aid in holding the battery firmly down on the pan, etc. there is provided battery engaging members 4 and 4' adapted to engage the top edge of the battery. The members 4 and 4' comprise two duplicate end portions of T-shaped cross sections joined by a rod 5 which spans the top of the battery and is welded or otherwise permanently secured to the center sections 6 and 6' of each battery engaging member. These center sections 6 and 6' engage the top surface of the battery adjacent an edge at each side thereof, while the lower half of the vertical flanges 7 and 7' engage a side surface of the battery, and the other half 7'' and 7''' projects upwardly above the center sections 6 and 6'.

The upwardly projecting flange portions 7'' and 7''' are provided with one or more openings 9 and 9' which are designed to selectively receive hook like lug members 10 and 10' one at each side of the battery. Long clamping bolts 11 and 11' having a threaded upper end are preferably attached to the battery support 2 and extend upwardly through an aperture in the lug members 10 and 10' and are secured against the lug members 10 and 10' by the nuts 12 and 12' which serve to hold the battery firmly down on the battery supporting member 2.

FIG. 2 illustrates the use of the holddown means in instances where the holddown bolts 11 and 11' are not located diametrically opposite each other as shown in FIG. 1. In this illustration the holddown bolts are staggered, in which case the members 10 and 10' are shifted to any one of the other several slots 9 and 9' which may be more convenient to use.

A further modification of the holddown device is shown in FIG. 3 in which one side of the battery is held in place on the support 2 by the usual long holddown bolt 11 while on the opposite side of the battery, the holddown function is performed by means of an angle member 13 and a clip member 14, the details of which are shown in FIGS. 4 and 5. One leg 13' of the angle member 13 is provided with a series of openings 15 and the clip 14 has a tongue 16 which projects diagonally upwardly and is adapted to selectively fit any one of the openings 15 in the leg portion 13'. The clip 14 also has one or more downwardly facing hooks 17 which fit over the upper edge of the upstanding end portion 7'' of the battery engaging member 4. The other leg of the angle member 13 has an elongated opening 18 to afford adjustment and a threaded bolt 19 extending upwardly from the body of frame member 20 through opening 18 and a nut 19' serves to urge the angle member 13 with its attached clip 14 downwardly to securely hold this side of the battery firmly on the supporting member 2.

The form of securing means shown in FIGS. 6 and 7 is another form of battery holddown used when the battery is mounted so that a portion of the vehicle extends adjacent and/or above the top of the battery, as shown at 30. Through the portion 30 there is provided a vertical slot 24 and in the slot 9' there is an upwardly extended offset portion 9'' which registers with the slot 24 and through this offset portion 9'' and the vertical slot 24 there is a bolt 26 for securing one of the battery engaging members 4 or 4' downwardly against the top edge of the battery. The slot 24 allows for a vertical adjustment of the holddown member relative to the top of the battery and the offset portion 9'' within the slot 9' aids the battery engaging member from horizontal movement.

I claim:

1. A battery securing means comprising:
    a. a rigid crossmember extending diametrically across the upper surface of the battery having elongated end portions adapted to engage portions of the upper edge of the battery;
    b. each of the elongated end portions having a portion for engaging the upper edge of the battery, a portion extending along the side of the battery adjacent the upper edge and a projected portion extending beyond the first mentioned portion;
    c. each therethrough; and the projected portion having a plurality of spaced openings therethrough; and
    d. a hooked clip adapted to engage at least one of the openings in at least one of the said projected portions having an opening therethrough whose axis is perpendicular to the elongated end portion for receiving a holddown bolt.

2. A battery securing means as defined in claim 1 wherein at least one of the spaced openings in at least one of the elongated end portions is provided with an angled offset opening for receiving a holding means.

3. A battery securing means comprising:
a. a rigid crossmember adapted to extend across the upper surface of a battery, said cross member having elongated end portions adapted to engage upper portions of a battery;
b. each of the elongated end portions having a portion for engaging the upper surface adjacent an upper edge of a battery, a portion adapted to extend along the side of the battery adjacent said upper edge and an upwardly projected portion extending beyond the first-mentioned portion; and
c. an adjustable bracket having a vertically extending portion adapted to engage the upwardly projected portion of one of the elongated end portions and outwardly extending portion for receiving means for urging the elongated end portion downwardly on the battery to hold it in place on a support.

4. A battery securing means as defined in claim 3 wherein the adjustable bracket comprises two parts in which one part is provided with a plurality of vertically arranged apertures and the other part is provided with a tongue adapted to selectively engage any one of the said apertures for adjusting the two parts relative to each other.